July 13, 1926.
C. H. BUTLER
1,592,418
PROCESS OF MAKING CANDY
Filed Oct. 20, 1925
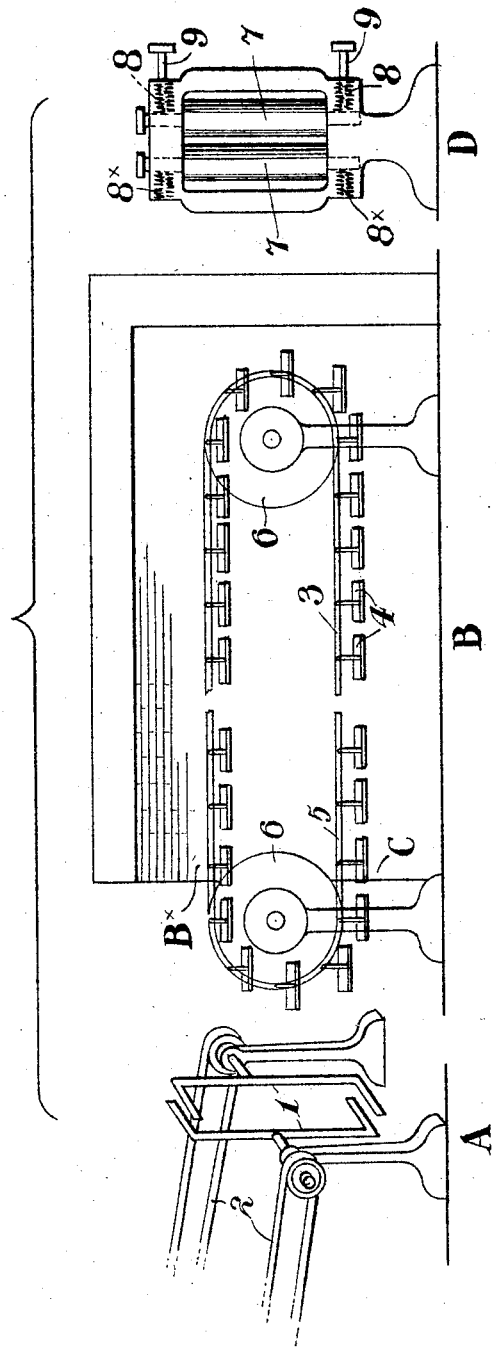
INVENTOR
Charles H. Butler
BY
ATTORNEY Patented July 13, 1926.

1,592,418

UNITED STATES PATENT OFFICE.

CHARLES H. BUTLER, OF NEW YORK, N. Y., ASSIGNOR TO THE SWEETS COMPANY OF AMERICA, INC., OF NEW YORK, N. Y., A CORPORATION OF VIRGINIA.

PROCESS OF MAKING CANDY.

Application filed October 20, 1925. Serial No. 63,770.

This invention has for its object the provision of a method for manufacturing pulled candy in which an usual consistency of texture is obtained.

The invention consists in the process hereinafter described, reference being made to the accompanying drawing which is a diagrammatic view showing embodiments of apparatus which may be used in carrying out the process.

In the drawing A represents a conventional type of candy pulling machine, comprising the arms 1, driven by belts 2. B represents an oven or hot room in which is disposed an endless carrier 3 supporting the pans 4 which are carried by the belt 5 over the supporting wheels 6, the pans entering the heating chamber at B$^x$ and emerging from the heating chamber at the point, C, or vice versa. D is a pressure device comprising the vertical rolls 7, which rolls are movable toward each other under the pressure of springs 8, 8$^x$, the tension of the latter being regulated by the screw devices 9. The above elements and devices are shown in diagrammatical form only, and devices of widely different form, but having the same general result, may be employed.

After cooking of ingredients suitable for pulled candy, according to any desired formula, the candy is cooled and is pulled or otherwise manipulated until it reaches a stage where it can be cut into lengths. By the pulling or other manipulation, the candy takes up air and becomes porous to a certain degree. The candy is then cut into lengths and placed in pans or trays in which it is conveyed to ovens, hot rooms or other heated receptacles and subjected to a dry heat until the air cells within the candy expand and the candy rises somewhat as would cake dough. I found that a suitable temperature is from 180° to 240° and a suitable time interval from one-half to two hours.

The heated air in the ovens or hot rooms or heated receptacles should be constantly circulated or agitated to insure uniformity of heat throughout. The subjection of the candy to this uniform and constantly circulated heated air not only causes the air in the cells of the candy to expand but a percentage of the moisture is driven off from the candy and absorbed by the dry hot air.

The dry heat treatment causes an ageing and graining effect on the candy and the expansion of the air in the cells increases the porosity of the candy.

I have discovered that the quality of the candy can be improved by rendering it slightly less porous, removing some of the air, and blending or reassociating the grains. Before my treatment of the candy to achieve said results, the grains are not uniform in size or arrangement in the candy structure and the pores or air cells are irregular, so that the candy is not uniformly blended. By my treatment I alter the grain structure of the candy by subjecting the latter to high pressure. In other words, I mechanically "flow" the structure internally as distinguished from merely changing the surface formation or shape of the candy, and the grains are uniformly blended and the porosity of the structure made uniform.

The high pressure can be applied in any suitable manner as by passing a batch of the candy through rolls having a spring or other resistance of the required degree, or by employing a hydraulic, screw or other press, preferably in such manner that the candy under treatment is subjected not only to pressure and internal movement but bodily movement as well. The pressure may conveniently be applied by passing the candy through rolls having a pressure sufficient to cause the internal structure to change with an alteration and reassociation of the grains, an operative pressure being 40 pounds per square inch, although the pressure may be varied somewhat from that degree.

Having described my invention what I claim and desire to secure by Letters Patent is as follows:—

1. A process of treating pulled candy, which consists in subjecting the candy to the action of dry heat after the candy has been pulled, then altering the grain structure of the candy by subjecting it to high pressure.

2. A process of treating candy, which consists in manipulating the candy to cause the formation of air cells therein, then subjecting the candy to heat whereby the air cells are expanded, then subjecting the candy to high pressure.

3. A process of treating pulled candy, which consists in subjecting the candy to a temperature of from 180° to 240° Fehrenheit, then subjecting the candy to high pressure.

4. A process of treating pulled candy, which consists in subjecting the candy to manipulation to form air cells therein, then subjecting the candy to heat, then applying to the candy a pressure of approximately 40 pounds per square inch.

5. A process as herein described, for so treating pulled candy that it is first made more light or porous by being subjected to heat and then compressed to a uniform grain and consistency.

In testimony whereof, I have signed my name to this specification.

CHARLES H. BUTLER.